United States Patent [19]
Stewart

[11] Patent Number: 5,633,888
[45] Date of Patent: May 27, 1997

[54] METHOD OF USING AN ACCESS POINT ADJACENCY MATRIX TO ESTABLISH HANDOFF IN A WIRELESS LAN

[75] Inventor: Brett B. Stewart, Austin, Tex.

[73] Assignee: Advanced Micro Devices, Inc., Sunnyvale, Calif.

[21] Appl. No.: 461,984

[22] Filed: Jun. 5, 1995

[51] Int. Cl.⁶ .................................................. H04L 27/30
[52] U.S. Cl. ................. 375/202; 455/34.1; 375/260; 370/332; 370/338
[58] Field of Search .............................. 375/202, 260, 375/205, 356, 358; 455/34.1, 56.1, 54.1; 370/18, 95.1; 379/59, 60

[56] References Cited

U.S. PATENT DOCUMENTS

| | | | |
|---|---|---|---|
| 4,716,573 | 12/1987 | Bergstrom et al. | 375/202 |
| 5,461,627 | 10/1995 | Rypinski | 370/95.2 |
| 5,509,027 | 4/1996 | Vook et al. | 375/202 |
| 5,539,769 | 7/1996 | Kosko et al. | 375/202 |
| 5,539,824 | 7/1996 | Bjorklund et al. | 380/21 |
| 5,546,397 | 8/1996 | Mahany | 455/52.1 |

FOREIGN PATENT DOCUMENTS

| | | | |
|---|---|---|---|
| 621707 | 4/1994 | European Pat. Off. | H04L 12/28 |
| WO93/19560 | 9/1993 | WIPO . | |

OTHER PUBLICATIONS

PCS Channel Assignment Strategies for Hand-Off and Initial Access, Yi-Bing Lin et al, IEEE Personal Communications, vol. 1, No. 3, 1994, NY, NY, pp. 47-56.

A Hybrid Indoor Data Network with Radio and Wire Performance Evaluation in a Rayleigh Channel, Kaname Arai et al, Phoenix Conference on Computers and Communications, Apr. 1-3, 1992, Scottsdale, AZ, pp. 255-259.

*Primary Examiner*—Tesfaldet Bocure
*Attorney, Agent, or Firm*—Foley & Lardner

[57] ABSTRACT

An adjacency matrix is incorporated into a local area network in order to provide smoother and faster transitions between mobile devices and access points of adjacent or overlapping microcells. The adjacency matrix can be based on fuzzy logic and updated periodically. Factors used to create the matrix can include the ability to establish a communication link, signal strength measurements, roam times, time of day, day of week and other factors germaine to the local area network topology and patterns of its usage. The mobile device thus effects the transition by attempting to communicate on the frequencies associated with hopping schemes of the access points which are most likely adjacent to the previous access point. As a result, the average transition time is greatly reduced.

18 Claims, 4 Drawing Sheets

FIG. 3

| ACCESS POINT | A | B | C | D | E | F |
|---|---|---|---|---|---|---|
| A | X | 1 | 0 | 0 | 1 | 0 |
| B | 1 | X | 0 | 0 | 1 | 1 |
| C | 0 | 0 | X | 1 | 0 | 1 |
| D | 0 | 0 | 1 | X | 1 | 1 |
| E | 1 | 1 | 1 | 1 | X | 0 |
| F | 0 | 1 | 1 | 0 | 0 | X |

1 = ADJACENT TO
0 = NOT ADJACENT TO

FIG. 4

| ACCESS POINT | A | B | C | D | E | F |
|---|---|---|---|---|---|---|
| A | X | .83 | .14 | .09 | .92 | .01 |
| B | .83 | X | .24 | .17 | .03 | .75 |
| C | .14 | .24 | X | .88 | .98 | .81 |
| D | .09 | .17 | .88 | X | .86 | .13 |
| E | .92 | .03 | .98 | .86 | X | .11 |
| F | .01 | .75 | .81 | .13 | .11 | X |

0 — NOT ADJACENT
1 — ADJACENT

METHOD OF USING AN ACCESS POINT ADJACENCY MATRIX TO ESTABLISH HANDOFF IN A WIRELESS LAN

BACKGROUND OF THE INVENTION

1. Field of the Invention

This invention is for use with wireless local area networks (LANs). Such networks include a plurality of mobile devices such as portable computers or other information processing devices, which communicate in a wireless fashion. The mobile devices normally communicate with a wired infrastructure via access points. Each access point represents a base station for a microcell which operates in accordance with a frequency hopping scheme in a frequency band, for example the frequency band from 2.4 to 2.4835 GHz. The mobile devices must establish communication links with new access points when they move out of range of old access points. Also, for proper load handling, it may be preferable to switch a mobile device to another access point to more uniformly distribute network capacity, even when the mobile device is still within range of its previous access point.

2. Description of the Related Art

One of the frequency bands on which wireless local area networks often communicate is the frequency band between 2.4 and 2.4835 GHz. This frequency band is relatively unregulated due to its poor characteristics and resulting low desirability. The poor nature of this frequency band is due to the fact that it is also the vibratory frequency range of a water molecule. Microwave ovens, which heat objects by vibrating the water molecules within them, therefore operate in this frequency range. Thus, a microwave oven can be viewed as a jammer or noise source which, when in operation, jams at least a portion of the 2.4 to 2.4835 GHz frequency spectrum.

As a result of the poor quality, wireless local area networks in this band typically employ a frequency hopping scheme with rapid switching from one channel within this frequency band to another channel within this frequency band. The band being 83.5 MHz wide, conventional channel distribution as set by current FCC regulations establishes 83 individual channels, each with a 1 MHz width. Thus, the first channel is from 2.405 to 2.4015 GHz, the second channel is from 2.4015 to 2.4025 GHz, and so on. Conventionally, 82 individual channels are used, leaving a guardband on either side of the frequency range.

A typical system will hop from one channel to another at a uniform hopping rate of, for example 10 hops per second. In order to maintain communication, each of the communicating devices must know when and where to hop. Normally, each access point continuously operates in accordance with a predetermined hopping scheme. Thus, once a mobile device knows the hopping scheme of the access point with which it is communicating, the mobile device can hop frequencies coincident with the access point.

About 65 relatively uncorrelated frequency hopping schemes have been established which provide effective orthogonal hopping, wherein for any given hopping scheme there will be few if any instances where two access points are communicating on the same frequency. Thus, each access point operates in accordance with one of these 65 hopping schemes.

In a typical system, a time mark frame is transmitted by each access point at the beginning of each frequency hop. The time mark frame includes identification of the channel number (i.e. the particular frequency) upon which the access point is broadcasting and an identification of the hopping sequence employed by the access point.

A problem arises when a mobile device transitions from communicating with one access point to communicating with another access point. In order to continue to communicate, the mobile device must determine which hopping scheme is employed by the new access point. A conventional method of establishing a communication link with the new access point has the mobile device operate in a "hunt" mode wherein it simply selects one of the 82 channels in use and waits until the new access point hops to this channel. Upon receipt of the time mark frame, the mobile device will then determine the hopping sequence being employed by the new access point and thereafter hop along with the new access point according to its hopping scheme.

Waiting for the access point to hop to the frequency selected by the mobile unit can result in a long transition time, causing a low data transmission rate. A further problem can occur if a nearby radiating source, such as a microwave oven or other source, happens to be operating at the selected "hunt" frequency. The operation of the radiating source at the frequency of interest could cause jamming for a long period of time, such that the communication link is not reestablished or is reestablished after an unacceptably long transition time.

Alternatively, the mobile device could transition by randomly hopping, eventually arriving at a frequency coincidentally used by the new access point. This strategy is as inefficient as the first, although it may reduce the effects of a nearby noise source and thus increase the statistical probability of establishing a communication link.

Alternatively, when the network is established and the access points are initially put in place, the manager of the local area network could set the hopping scheme for each access point and establish a system by which each access point could inform the mobile devices with which it communicates of the hopping schemes of the neighboring access points. Such a strategy, however, requires an extensive amount of skill and effort on the part of the local area network manager. Also, a significant amount of work would be required when changes in the local area network topology occur, such as incorporating additional access points to handle increased capacity on a busy local area network. It is therefore beneficial to have a local area network topology wherein the access points and mobile devices can, over time, determine the relationships therebetween and continuously update the relationships such that when a mobile device transitions from communicating with one access point to communicating with another access point, the mobile device has a good idea which frequency hopping scheme is likely to be employed when it completes the transition.

SUMMARY OF THE INVENTION

It is therefore an object of the invention to provide a method for easily determining the likely frequency hopping scheme of a new access point.

It is a further object of the invention to have this determination made without involving any significant effort on the part of the LAN users or LAN manager.

It is a further object of the invention to provide fast transition times when a mobile device, such as a computer or other information processing equipment, transitions from communicating with one access point to communicating with another access point.

An apparatus according to the invention incorporates an access point adjacency matrix which is referenced by a mobile device when it makes a transition from one access point to another. This adjacency matrix provides the mobile device with information on which frequency hopping schemes are most likely employed by the new access point. The access point adjacency matrix is created based on one or more factors. These factors include signal strength measurements taken by the mobile device, signal strength measurements taken by the access points, and roam times previously accomplished between given access points. Further, the measurements can be repeated on a periodic basis in order to continuously update the access point adjacency matrix.

Thus, the invention provides a method of maintaining communication in a wireless local area network (LAN) with an access point coverage topology in a dynamic environment, the LAN containing a plurality of access points and a plurality of active mobile devices, the method comprising the steps of:

(a) assigning a unique frequency hopping scheme to each of the access points;

(b) initiating a communication link between an active mobile device and a corresponding one of the access points, the communication link being in accordance with the frequency hopping scheme of the access point;

(c) determining, for the active mobile devices, a most likely frequency hopping scheme of an alternate access point by referring to an access point adjacency matrix, the alternate access point being different from the corresponding access point;

(d) attempting to establish a communication link between the active mobile device and the alternate access point in accordance with the most likely frequency hopping scheme; and (e) returning to the adjacency matrix to obtain a next most likely frequency hopping scheme if the communication link is not established in step (d), wherein steps (d) and (e) are repeated until the frequency hopping scheme of the alternate access point is obtained from the adjacency matrix and a communication link is established between the active mobile device and the alternate access point in accordance with its frequency hopping scheme.

The present invention also provides a method of creating an access point adjacency matrix. This can be accomplished by scanning, on a periodic basis from at least one of the mobile devices, frequencies associated with frequency hopping schemes other than that of the access point corresponding to the at least one mobile device; measuring a signal strength for each of the scanned frequencies; reporting the signal strength measurements from the at least one mobile device to the access point associated with the at least one mobile device; and creating the access point adjacency matrix based on the reported signal strength measurements.

Alternatively, the access point adjacency matrix can be created by scanning, on a periodic basis from at least one of the access points, frequencies associated with frequency hopping schemes of the other access points; measuring a signal strength for each of the scanned frequencies; and creating the access point adjacency matrix based on the measured signal strengths.

Alternatively, the access point adjacency matrix can be created by measuring roam times between access points when a mobile device transitions from communicating with one access point to communicating with another access point; and creating the access point adjacency matrix based on the measured roam times.

Alternatively, the access point adjacency matrix can be created by scanning, on a periodic basis from at least one of the mobile devices, frequencies associated with frequency hopping schemes other than that of the access point corresponding to the at least one mobile device; determining whether the at least one mobile device can hear the access points associated with the scanned frequencies; reporting whether the at least one mobile device can hear the access points associated with the scanned frequencies to the access point associated with the at least one mobile device; and creating the access point adjacency matrix based on the reported information.

Alternatively, the access point adjacency matrix can be created by scanning, on a periodic basis from at least one of the access points, frequencies associated with frequency hopping schemes of the other access points; determining whether the at least one access point can hear the access points associated with the scanned frequencies; and creating the access point adjacency matrix based on the determination.

Also, the scanning, measuring and reporting steps used to create an access point adjacency matrix can be repeated on a periodic basis, the access point adjacency matrix being periodically updated based on the repeated scanning, measuring and reporting.

Also provided is a wireless local area network in accordance with the invention, which includes:

a plurality of access points, each containing an access point memory, each access point having a unique frequency hopping scheme;

a plurality of mobile devices, each communicating with a corresponding access point in accordance with the frequency hopping scheme of the corresponding access point;

a wired infrastructure connecting the access points to each other, such that the access points can freely communicate with each other; and an access point adjacency matrix, contained in each of the memories of the access points, the access point adjacency matrix containing information indicating the likelihood of adjacency between access points, wherein a mobile device transitioning from communicating with its corresponding access point to communicating with another access point establishes communication with the other access point in accordance with information contained in the access point adjacency matrix which the mobile device received from its corresponding access point.

The access point adjacency matrix contained in the wireless LAN can be based on information related to signal strength measurements taken from at least one of the access points of signals sent from the other access points. Alternatively, it can be based on information related to signal strength measurements taken from at least one mobile device of signals sent from the other access points to the mobile device. Alternatively, it can be based on information related to roam times measured when a mobile device transitions from communicating with one access point to communicating with another access point.

The invention also provides a method of establishing a wireless local area network, comprising the steps of:

distributing a plurality of access points within a network coverage area;

storing an access adjacency matrix in a memory associated with each access point; and connecting at least one mobile device to an infrastructure via a corresponding one of the access points identified by the access point adjacency matrix. This method of establishing a wireless LAN can also include moving the at least one mobile device out of communication range from the corresponding one of the access points; and connecting the at least one mobile device to the infrastructure via an alternate access point in accordance with the access point adjacency matrix.

BRIEF DESCRIPTION OF THE DRAWINGS

These and other objects of the invention will be apparent upon review of the description and figures, wherein;

FIG. 3 is an access point adjacency matrix containing absolute values;

FIG. 4 is an access point adjacency matrix containing probability values based on fuzzy logic.

DETAILED DESCRIPTION

Figure 1:
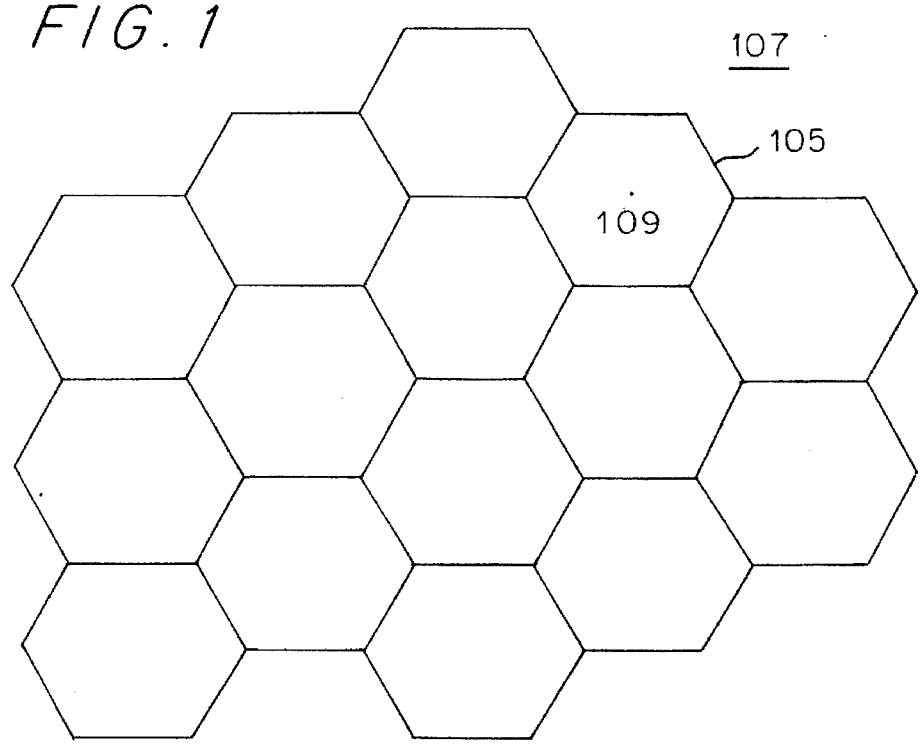
FIG. 1 shows a configuration of a plurality of microcells in a local area network.

FIG. 1 shows one configuration of a plurality of microcells 105 within a communicating area 107. Each microcell 105 is associated with and serviced by an access point 109. Mobile devices, such as computers, located in microcell 105 communicate through the access point 109. Each of the microcells 105 covers a service area with a radius from access point 109 of approximately 50 meters.

The configuration shown in FIG. 1 is fairly uniform, and is associated with a generally even distribution of mobile devices throughout area 107. Alternatively, the mobile devices on a wireless local area network can be, and most likely are, unevenly distributed. In such a case, a large number of devices may be concentrated in one region and a small number of devices may be contained in another region. As a result, the access points need not be distributed based on coverage area but can instead be distributed based on their capacity requirements. In a high-density environment, more than one access point may share the same coverage area.

Figure 2:
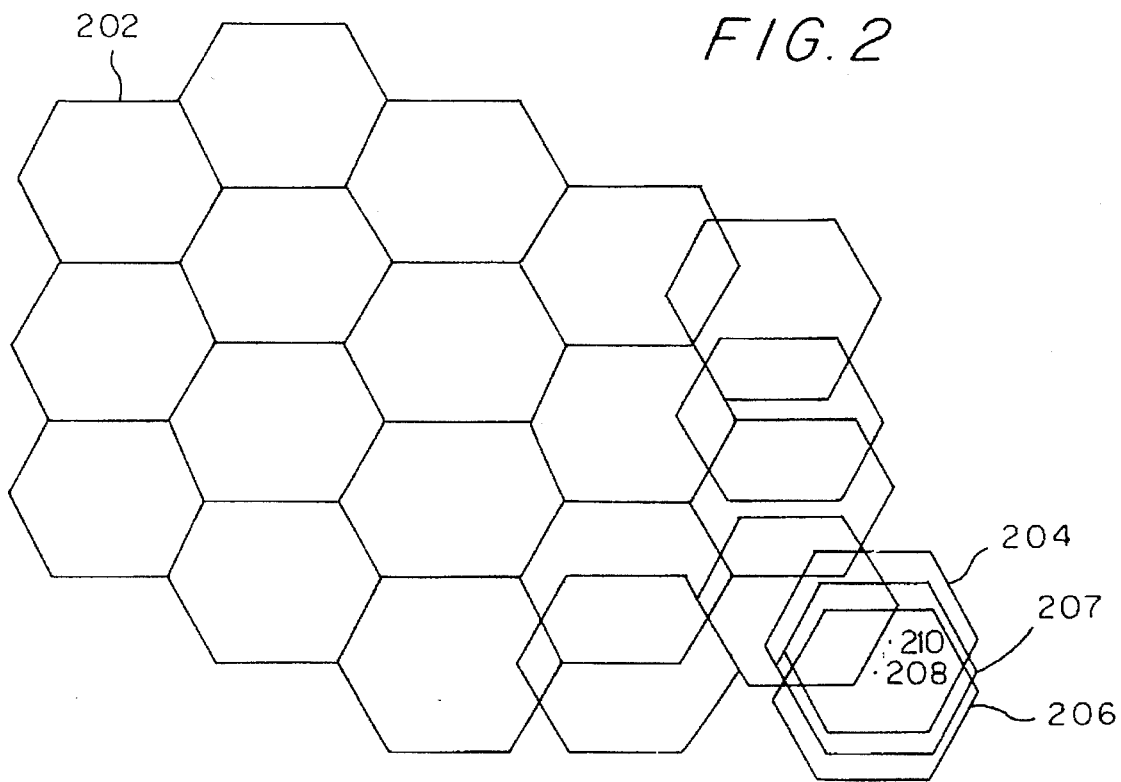
FIG. 2 shows an alternative configuration of a plurality of microcells in a local area network.

FIG. 2 shows such a distribution of microcells arranged to accommodate an uneven distribution of mobile devices. For example, microcell 202 and its neighboring microcells contain a fairly low density of mobile devices therein. On the other hand, microcell 204 and its neighboring microcells contain a fairly dense distribution of mobile devices.

The distribution shown in FIG. 2 can be related to a corporation wherein the low density microcells, such as microcell 202, are associated with the senior management or marketing functions, and the high density microcells, such as microcell 204, are associated with the research and development or accounting functions. Thus, the larger office space and less frequent computer usage associated with the senior management functions results in microcells whose density is dictated solely by the range of the access points associated therewith. On the other hand, in areas where office size is relatively small and computer usage is relatively high, the density of the microcells is dictated purely by the capacity of the associated access points. Further, in an extremely high traffic environment, such as a computer-based classroom, a plurality of access points can overlap within the same region. An example of multiple access points overlapping in a region is shown by the microcells 206 and 207 which are respectively associated with access points 208 and 210.

Figure 2A:
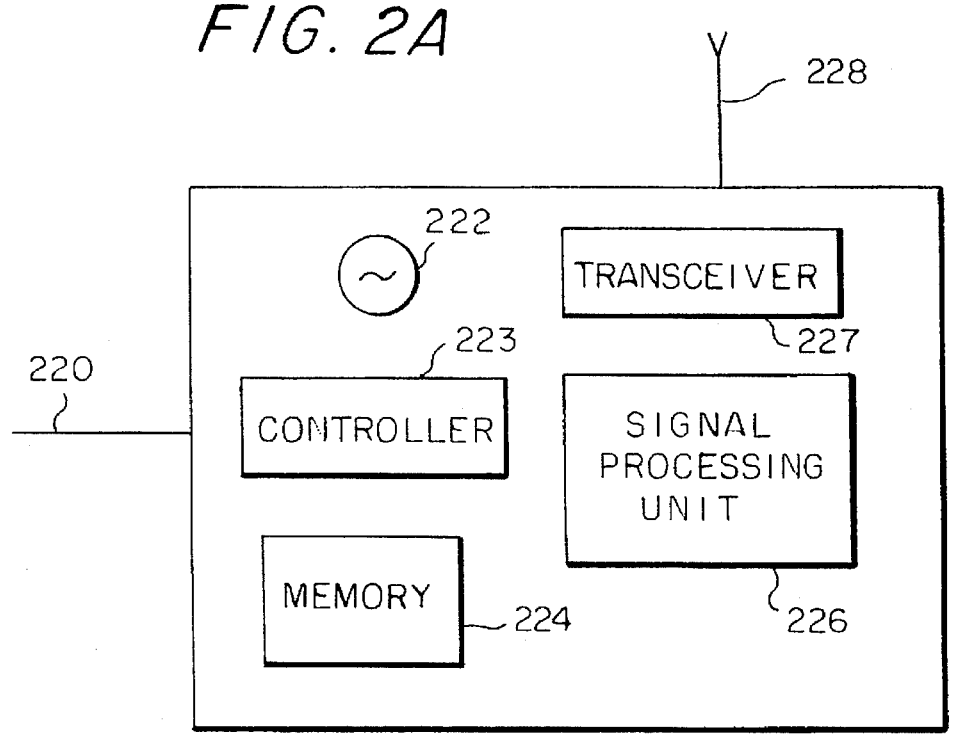
FIG. 2A shows a block diagram of an access point.

FIG. 2A shows a block diagram of an access point such as access point 109. The access point communicates with the other access points and the wired infrastructure via communication lines of communication bus 220. The access point includes a clock 222, a controller 223, a memory 224, a signal processing unit 226, a transceiver 227, and a antenna 228.

Memory 224 contains the frequency hopping scheme associated with the access point. In accordance with the frequency hopping scheme and a clock signal provided by clock 222, controller 223 causes signal processing unit 226 to change the operating frequency of the access point (hop) at regular intervals. At the beginning of each hop, a time mark signal is transmitted on the new frequency via transceiver 227 and antenna 228. In place of internal clock 222, the access point can be clocked by an external clock which is shared by the access points of the system.

Figure 2B:
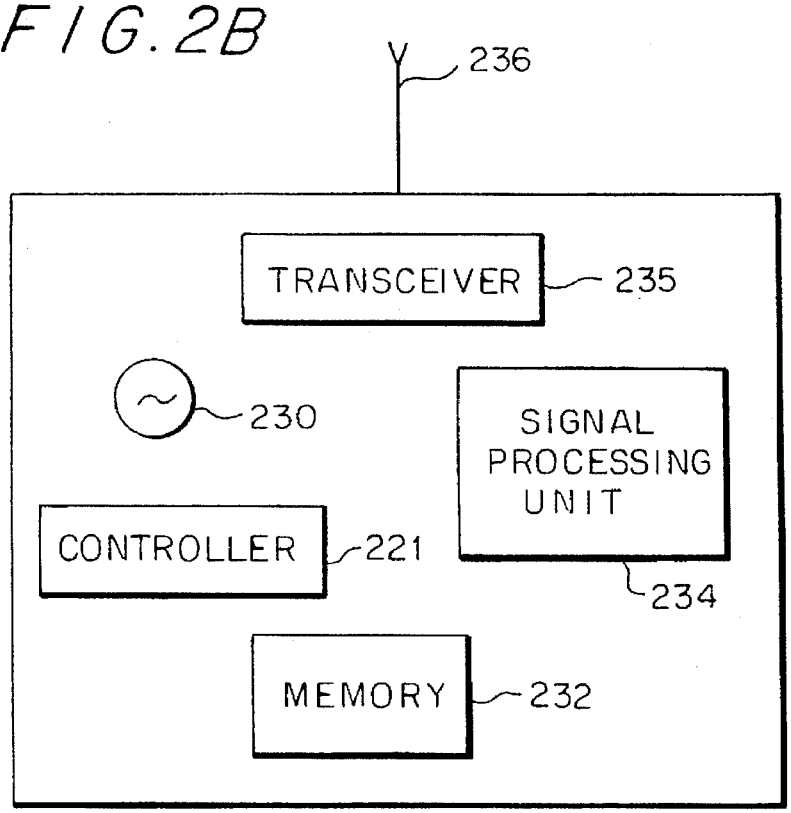
FIG. 2B shows a block diagram of a mobile device.

FIG. 2B shows a block diagram of a mobile unit communicating with an access point such as access point 109. The mobile unit contains an internal clock 230, a controller, a memory 232, a signal processing unit 234 and a transceiver 235. The mobile unit communicates with an associated access point via antenna 236.

The mobile unit stores, in memory 232, each of the hopping schemes employed by the access points. It also stores an identifier of the hopping scheme of its associated access point. Thus, in synchronism with clock 230, controller 221 causes signal processing unit 234 to change the operating frequency of the mobile unit to hop according to the hopping scheme of the associated access point.

During operation, a mobile device may need to transition from communicating with one access point to communicating with another access point. In the distribution shown in FIG. 1, this transition is purely driven by the mobile device moving from the microcell covered by one access point to a microcell covered by another access point. If operating in microcell 206 of FIG. 2, on the other hand, it may be necessary to switch from communicating with access point 208 to communicating with access point 210 in order to, for example, more evenly distribute the capacity between the access points. In either case, the transition will be smoother and faster if an access point adjacency matrix in accordance with the invention is utilized. Further, this increased speed will be attained without a commensurate increased burden upon the user or manager of the local area network.

FIG. 3 shows an example of an adjacency matrix for six access points A through F. As is readily apparent, the matrix of FIG. 3 is symmetric, containing two matching triangular portions, such that only one triangular portion of the matrix need be stored. It is also apparent that this is an idealized matrix wherein for each entry it is known whether one access point is either adjacent to or not adjacent to another access point. As can be seen from this matrix, access point A is adjacent to access points B and E. Access point B is adjacent to access point A (a required conclusion since access point A is adjacent to access point B) and access point F. Similarly, access point C is adjacent to access points D, E, and F, access point D is adjacent to access points C and E, access point E is adjacent to access points A, C, and D, and access point F is adjacent to access points B and C.

The adjacency matrix of FIG. 3 is an adjacency matrix that can be created by the manager of the local area network at the time of establishing the network. It has absolutely known values, 1 equaling "adjacent to" and 0 equaling "not adjacent to." The network manager, upon creating the matrix, will then cause the matrix to be stored, for example, in memory 224 of each of the access points. This information can be communicated from the access points to the mobile units. Each of the mobile units can then store in memory 232, either the entire adjacency matrix or a relevant portion of the adjacency matrix related to the access point with which the mobile unit is communicating.

Further, for the information in the matrix to be accurate, the manager of the network must continuously update the matrix as the network topology changes. Thus, if a new access point is added to the network, the network manager must confirm or recalculate each of the adjacency parameters and create a new adjacency matrix. This new adjacency matrix must then be communicated to the access points to update the contents of their memory 224. Also, physical changes in the environment may change the adjacency matrix. For example, moving a metal file cabinet from one location to another may affect the size and shape of one or more proximate microcells such that two microcells which were not previously adjacent are now adjacent, or such that two microcells which were previously adjacent are now not adjacent.

FIG. 4 shows a similar adjacency matrix. However, in the adjacency matrix of FIG. 4 the adjacency values are not absolute, but instead can take on values between 0 and 1. The closer a value is to zero, the more likely the access points are not adjacent. Similarly, the closer a value is to 1, the more likely the access points are adjacent. In this way, an element of "fuzzy" logic is incorporated into the local area network topology to inform the transitioning mobile device of the access points which are most likely to be adjacent to the access point with which the device is currently communicating.

The matrices shown in FIGS. 3 and 4 are limited, merely for purposes of simplicity, to six access points. The benefits of using an access point adjacency matrix are more readily apparent if one presumes that the local area network in actuality has 50 access points. A 50× 50 adjacency matrix is then used. For any given access point, a small number of the 49 other access points, for example, 3 to 4, would have high adjacency values. Thus, by consulting an adjacency matrix similar to that of FIG. 4, the mobile device can immediately rule out most of the other access points and quickly determine which access points are most likely adjacent to the access point currently being used by the mobile device. The mobile device can further determine the likelihood of adjacency associated with each of these access points.

For example, presume a mobile device is currently communicating with access point A. If the mobile device is moving out of range of access point A, the mobile device can refer to an adjacency matrix such as that shown in FIG. 4 to determine the most likely adjacent access point. The adjacency matrix, or a portion thereof, is stored in memory 232 of the mobile device. The adjacency matrix of the mobile device can be updated periodically by the mobile device receiving an updated adjacency matrix from its associated access point.

By consulting the adjacency matrix of FIG. 4, the mobile device knows that the adjacent access point is likely access point E or access point B. Further, of these two it knows that there is a slightly greater probability that it is access point E.

Thus, the mobile device can tune to the frequency one hop ahead of the current frequency according to the hopping scheme employed by access point E. The mobile device can then "lurk" on this frequency to wait for access point E on its next hop. Further, the mobile device can hop according to the hopping scheme of access point E for a few hops in an attempt to link up with access point E.

In this example, the memory of the mobile device contains information regarding the entire adjacency matrix. Alternatively, the mobile device can employ a smaller memory which is updated by access point A to contain information regarding the hopping sequences of each potentially adjacent access point, and the current position in each of the hopping sequences. In this case, the mobile device would be informed that access point E is the most likely adjacent access point, be provided the hopping sequence of access point E, and be provided the current position is the hopping sequence of access point E. Similar information would be provided for the other likely adjacent access points.

In either case, if the mobile device is unable to communicate with access point E such that it determines that the adjacent access point is not access point E, the mobile device can then adjust its frequencies in accordance with the hopping scheme of access point B. If the mobile device can not link up with access point B, it will move on to the next most likely access point, and continue in this manner until a communication link is established. Thus, in most cases the mobile device will very quickly link up with the adjacent access point in accordance with the frequency hopping scheme of the adjacent access point.

As mentioned above, the mobile device should hop along with the scheme of access point E for at least a few hops before trying the hopping scheme of access point B. This is because there is a possibility, in the frequency environment within which the wireless local area networks operate, that a single channel might be disrupted. Thus, if the mobile device only tries to link up with access point E at one frequency, it is possible that the inability to establish a communication link is due to interference and not because the adjacent access point is other than access point E.

There are many ways in which the local area network can obtain the adjacency values over time for incorporation into an adjacency matrix similar to that of FIG. 4. One way is for a mobile device to periodically scan in accordance with hopping schemes associated with access points other than the access point with which the mobile device is currently communicating. In this way, the mobile device can determine whether communications are possible between itself and any other access points. There is a greater likelihood that the mobile device can communicate with access points adjacent to its current access point than with access points which are not adjacent to its current access point. Thus, for those access points with which communication can be established, a high probability of adjacency can be placed in the adjacency matrix. Each mobile device can provide this information to its associated access point so that an adjacency matrix can be developed. Over time, the mobile devices can continue to periodically scan these frequencies and provide information to update the adjacency matrix accordingly.

Similarly, instead of merely attempting to communicate with other access points, the mobile devices can periodically take signal strength readings on frequencies according to the hopping schemes of the other access points. There is a greater likelihood that a strong signal will be received from an adjacent access point than from a non-adjacent access point. Thus, this signal strength information can be provided to the access points and used to create an adjacency matrix. Over time, the mobile devices can continue to measure signal strengths from the other access points in order to provide information for continuously updating the adjacency matrix.

In a similar manner, an access point can periodically take measurements as to whether it can communicate with other access points or as to the signal strength of a signal from other access points. This information can also be used to create or update an adjacency matrix.

Also, it should be clear that a combination of adjacency schemes can be employed. For example, both the mobile units and access points can make periodic measurements with the results of these measurements being used to update or create the adjacency matrix.

Another factor which can be incorporated into an adjacency matrix is a measurement of roam time between access points. For example, when a mobile unit transitions from one access point to another access point, a measurement can be taken as to how long it takes to complete the transition. This information can then be provided to the access points so that, over time, given a sufficient number of transitions, a matrix could be established which shows that, on average, transitions between some access points occur relatively quickly while transitions between other access points take a relatively long period of time. It is more likely that access points which transition quickly are adjacent and that access points which transition over a long period of time are not adjacent. This information can be used to establish an adjacency matrix or be used in a cumulative manner with the other schemes discussed above in creating and/or updating an adjacency matrix.

Additional information unique to the operating environment can also be built into the adjacency matrix. For example, if over time the system learns that in the morning the devices tend to move in one direction while in the evening they tend to move in another direction, this information can be built into an adjacency matrix which varies depending on the time of day. An example of such a situation could be where a series of access points are aligned along a corridor in an office building such that the majority of transitions are into the office building in the morning and out of the office building in the evening. Similar dynamics resulting from the office culture can be learned by the system in order to create a plurality of adjacency matrices for a given access point. For example, access points in conference rooms can have very busy periods coinciding with meetings occurring in the conference rooms, and inactive periods when meetings are not occurring in the conference rooms. In addition, day of week, month or season can also be incorporated into the system in order to provide the most comprehensive set of adjacency matrices.

Thus, in accordance with the present invention, while communicating with an access point, a mobile device can be continuously updated as to either the adjacency matrix or the portions of the frequency matrix relevant to its associated access point. Therefore, when the mobile device transitions to communicating in a neighboring or overlapping microcell, it can set its frequency based on the adjacency matrix in order to select the frequencies and hopping schemes associated with the access points which are most likely associated with the new microcell. As a result, the transition between microcells will be smoother and faster, resulting in a higher system efficiency.

Figure 5:
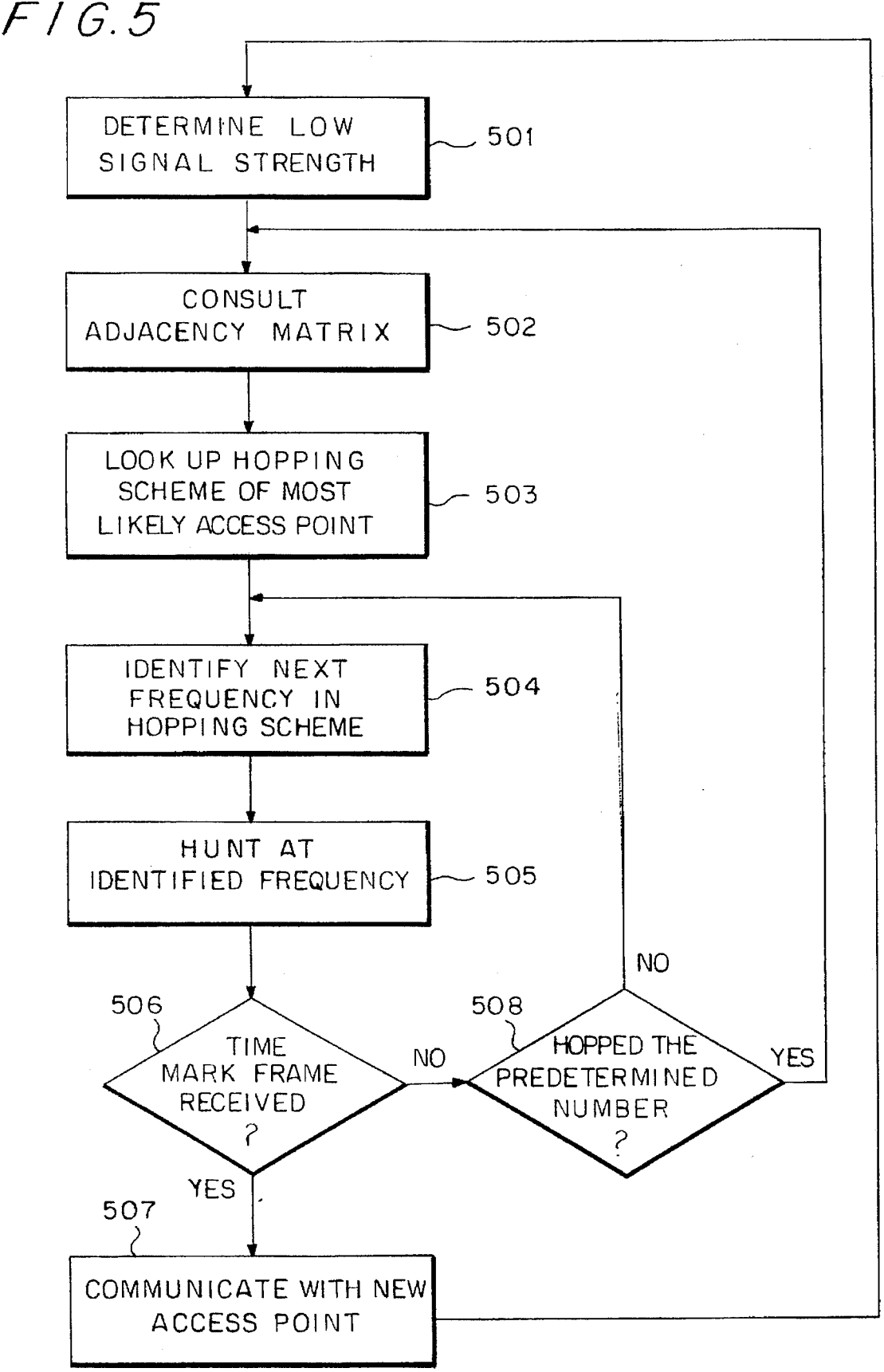
FIG. 5 is a flow diagram showing a mobile unit transitioning from communicating with one access point to communicating with another access point in accordance with the invention.

FIG. 5 is a flowchart describing an example of a method used when a mobile device transitions from communicating with one access point to communicating with another access point in accordance with the invention. In this example, the mobile device is transitioning from one access point (a current access point) to another access point (a future access point) because it is moving out of range of the current access point and therefore into a new microcell associated with the future access point.

At step 501, the mobile unit determines that the signal strength from the current access point is below a predetermined threshold level. This determination is based on a plurality of periodic signal strength measurements taken by the mobile unit while communicating with the current access point.

At step 502, the mobile device then consults the adjacency matrix, or relevant portion thereof, stored in memory 232. The mobile device thus identifies the access point having the highest adjacency value, indicating that it is the access point most likely to be adjacent to the current access point.

At step 503 the mobile device looks up the hopping scheme associated with the access point identified in step 502. In step 504, the mobile device then determines the frequency to which the access point identified in step 502 will next hop if it is operating according to the hopping scheme. In step 505, the mobile device enters the "hunt" mode and tunes to the frequency identified in step 504.

At step 506, the mobile device determines if a time mark frame is received. If so, the mobile device establishes communication with the new access point in accordance with the hopping scheme, step 507. If not, the mobile device proceeds to step 508 to determine if it has hopped for the predetermined number of hops in accordance with the hopping scheme associated with the access point identified in step 502. If not, it returns to step 504 to identify the next frequency in the hopping scheme. If the mobile device determines in step 508 that it has hopped in accordance with the hopping scheme associated with the access point identified in step 502 for the predetermined number of steps, it returns to step 502 to consult the adjacency matrix to identify the next most likely access point.

The mobile device continues in this manner until it identifies the new access point. It then communicates with the new access point, as shown in step 507, continuing to take signal strength measurements until it determines a low signal strength, at which time the process of hunting for the next access point commences from step 501.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of maintaining communication in wireless local area network (LAN) with an access point coverage topology in a dynamic environment, the LAN containing a plurality of access points and a plurality of active mobile devices, the method comprising the steps of:

(a) assigning a unique frequency hopping scheme to each of the access points;

(b) initiating a communication link between an active mobile device and a corresponding one of the access points, the communication link being in accordance with the frequency hopping scheme of the access point;

(c) determining, for the active mobile devices, a most likely frequency hopping scheme of an alternate access point by referring to an access point adjacency matrix, the alternate access point being different from the corresponding access point;

(d) attempting to establish a communication link between the active mobile device and the alternate access point in accordance with the most likely frequency hopping scheme; and (e) returning to the adjacency matrix to obtain a next most likely frequency hopping scheme if the communication link is not established in step (d), wherein steps (d) and (e) are repeated until the frequency hopping scheme of the alternate access point is obtained from the adjacency matrix and a communication link is established between the active mobile device and the alternate access point in accordance with its frequency hopping scheme.

2. A method as recited in claim 1, further comprising the step of creating the access point adjacency matrix.

3. A method as recited in claim 2, wherein the step of creating the access point adjacency matrix comprises the steps of:

scanning, on a periodic basis from at least one of the mobile devices, frequencies associated with frequency hopping schemes other than that of the access point corresponding to the at least one mobile device;

measuring a signal strength for each of the scanned frequencies;

reporting the signal strength measurements from the at least one mobile device to the access point associated with the at least one mobile device; and creating the access point adjacency matrix based on the reported signal strength measurements.

4. A method as recited in claim 2, wherein the step of creating the access point adjacency matrix comprises the steps of:

scanning, on a periodic basis from at least one of the access points, frequencies associated with frequency hopping schemes of the other access points;

measuring a signal strength for each of the scanned frequencies; and creating the access point adjacency matrix based on the measured signal strengths.

5. A method as recited in claim 2, wherein the step of creating the access point adjacency matrix comprises the steps of:

measuring roam times between access points when a mobile device transitions from communicating with one access point to communicating with another access point; and creating the access point adjacency matrix based on the measured roam times.

6. A method as recited in claim 2, wherein the step of creating the access point adjacency matrix comprises the steps of:

scanning, on a periodic basis from at least one of the mobile devices, frequencies associated with frequency hopping schemes other than that of the access point corresponding to the at least one mobile device;

determining whether the at least one mobile device can hear the access points associated with the scanned frequencies;

reporting whether the at least one mobile device can hear the access points associated with the scanned frequencies to the access point associated with the at least one mobile device; and creating the access point adjacency matrix based on the reported information.

7. A method as recited in claim 2, wherein the step of creating the access point adjacency matrix comprises the steps of:

scanning, on a periodic basis from at least one of the access points, frequencies associated with frequency hopping schemes of the other access points;

determining whether the at least one access point can hear the access points associated with the scanned frequencies; and creating the access point adjacency matrix based on the determination.

8. A method as recited in claim 3, wherein the scanning, measuring and reporting steps are repeated on a periodic basis, the method further comprising the step of updating the access point adjacency matrix based on the repeated scanning, measuring and reporting.

9. A method as recited in claim 4, wherein the scanning and measuring steps are repeated on a periodic basis, the method further comprising the step of updating the access point adjacency matrix based on the repeated scanning and measuring.

10. A method as recited in claim 5, wherein the measuring step is repeated on a periodic basis, the method further comprising the step of updating the access point adjacency matrix based on the repeated measuring.

11. A method as recited in claim 6, wherein the scanning, determining and reporting steps are repeated on a periodic basis, the method further comprising the step of updating the access point adjacency matrix based on the repeated scanning, determining and reporting.

12. A method as recited in claim 7, wherein the scanning and determining steps are repeated on a periodic basis, the method further comprising the step of updating the access point adjacency matrix based on the repeated scanning and determining.

13. A wireless local area network, comprising:

a plurality of access points, each containing an access point memory, each access point having a unique frequency hopping scheme;

a plurality of mobile devices, each communicating with a corresponding access point in accordance with the frequency hopping scheme of the corresponding access point;

a wired infrastructure connecting the access points to each other, such that the access points can freely communicate with each other; and an access point adjacency matrix, contained in each of the memories of the access points, the access point adjacency matrix containing information indicating the likelihood of adjacency between access points, wherein a mobile device transitioning from communicating with its corresponding access point to communicating with another access point establishes communication with the other access point in accordance with information contained in the access point adjacency matrix which the mobile device received from its corresponding access point.

14. A wireless local area network as recited in claim 13, wherein the access point adjacency matrix is based on information related to signal strength measurements taken from at least one of the access points of signals sent from the other access points.

15. A wireless local area network as recited in claim 13, wherein the access point adjacency matrix is based on information related to signal strength measurements taken from at least one mobile device of signals sent from the other access points to the mobile device.

16. A wireless local area network as recited in claim 13, wherein the access point adjacency matrix is based on information related to roam times measured when a mobile device transitions from communicating with one access point to communicating with another access point.

17. A method of establishing a wireless local area network, comprising the steps at:

distributing a plurality of access points within a network coverage area;

storing an access adjacency matrix in a memory associated with each access point; and connecting at least one mobile device to an infrastructure via a corresponding one of the access points identified by the access point adjacency matrix.

18. A method as recited in claim 17, further comprising:

moving the at least one mobile device out of communication range from the corresponding one of the access points; and connecting the at least one mobile device to the infrastructure via an alternate access point in accordance with the access point adjacency matrix.

* * * * *